United States Patent
Kang et al.

(10) Patent No.: US 9,262,691 B2
(45) Date of Patent: Feb. 16, 2016

(54) METHOD FOR EXTRACTING SALIENT OBJECT FROM STEREOSCOPIC IMAGE

(71) Applicant: CATHOLIC UNIVERSITY INDUSTRY ACADEMIC COOPERATION FOUNDATION, Seoul (KR)

(72) Inventors: Hang-Bong Kang, Seoul (KR); Sang-Hyun Cho, Incheon (KR)

(73) Assignee: CATHOLIC UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 22 days.

(21) Appl. No.: 14/262,636

(22) Filed: Apr. 25, 2014

(65) Prior Publication Data

US 2015/0169983 A1    Jun. 18, 2015

(30) Foreign Application Priority Data

Dec. 17, 2013  (KR) .................. 10-2013-0157077

(51) Int. Cl.
*G06K 9/00* (2006.01)
*G06K 9/34* (2006.01)
(Continued)

(52) U.S. Cl.
CPC ............ *G06K 9/4676* (2013.01); *G06K 9/6202* (2013.01); *G06T 7/0081* (2013.01); *G06T 2207/10012* (2013.01); *G06T 2207/10024* (2013.01)

(58) Field of Classification Search
CPC .. G06K 9/4676; G06K 9/6202; G06T 7/0075; G06T 2207/10012; G06T 7/0022; H04N 13/0239; H04N 2013/0081

USPC ......... 382/154, 103, 209, 173, 228, 190, 298, 382/162, 199, 217, 277, 153, 240, 284, 382/159; 702/127, 188, 179, 182, 186, 183; 345/419, 426; 706/26

See application file for complete search history.

(56) References Cited

U.S. PATENT DOCUMENTS

| 6,862,364 B1 * | 3/2005 | Berestov ................... 382/132 |
| 9,064,319 B2 * | 6/2015 | Hong et al. |
| 2014/0180063 A1 * | 6/2014 | Zhao et al. ................. 600/424 |

FOREIGN PATENT DOCUMENTS

KR    20130052393 A    5/2013

OTHER PUBLICATIONS

Yuzhen Niu et al., "Leveraging stereopsis for saliency analysis," In CVPR 12, pp. 454-461.*

(Continued)

*Primary Examiner* — Sheela C Chawan
(74) *Attorney, Agent, or Firm* — Andrew W. Chu; Craft Chu PLLC

(57) ABSTRACT

The method for extracting salient object from stereoscopic video includes: dividing regions based on the similarity of color and the distance between pixels in a left-eye image and a right-eye image which are used for an input stereoscopic image; creating a disparity map based on a disparity obtained from a pixel difference of the left-eye image and the right-eye image; calculating a contrast-based saliency by comparing the divided regions and the divided regions of the disparity map; calculating a prior-knowledge-based saliency based on a prior-knowledge for the divided regions and the divided regions of the disparity map; and extracting salient regions of the image based on the contrast-based saliency and the prior-knowledge-based saliency.

11 Claims, 9 Drawing Sheets

(51) Int. Cl.
 *G06T 15/00* (2011.01)
 *G06K 9/46* (2006.01)
 *G06K 9/62* (2006.01)
 *G06T 7/00* (2006.01)

(56) References Cited

OTHER PUBLICATIONS

S. Goferman, L. Zelnik-Manor, and A. Tal. "Context-aware saliency detection," In CVPR '10, pp. 2376-383.

J. Harel, C. Koch, and P. Perona. "Graph-based visual saliency," Adv. Neural Information Process. Sys., vol. 19, pp. 545-552.

X. Hou and L. Zhang. "Saliency detection: a spectral residual approach," In CVOR '07, pp. 1-8.

R. Achanta, S. Hemami, F. Estrada, and S. Susstrunk. "Frequency-tuned salient region detection," In CVPR '09, pp. 1597-1604.

M. Cheng, G. Zhang, N. J. Mitra, X. Huang, and s. Hu. "Global contrast based salient region detection," In CVPR '11, pp. 409-416.

Y. Niu, Y. Geng, X. Li, and F. Liu. "Leveraging steropsis for saliency analysis," In CVPR '12, pp. 454-461.

* cited by examiner (a) (b) (c)

(d) (e) (f)

(a) (b) (c) (d) (e)

(f)　　(g)　　(h)　　(i)　　(j)

METHOD FOR EXTRACTING SALIENT OBJECT FROM STEREOSCOPIC IMAGE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a method for extracting salient object from stereoscopic image and in particular an enhanced method for extracting salient object from stereoscopic image by using contrast of a 3D image and prior-knowledge of an image and by applying the quality of disparity to the image.

2. Description of Related Art Including Information Disclosed Under 37 CFR 1.97 and 37 CFR 1.98

In stereoscopic image, 3D image is reproduced by shooting the same object with cameras spaced apart to obtain a left-eye image and a right-eye image and by displaying the left-eye and right-eye images alternately. In case that the left-eye image and the right-eye image are displayed alternately, binocular disparity is generated in the imaginary image without need to shoot the object, and the left-eye and right-eye images are transmitted to brain via retina and then the images are merged to reproduce the depth perception and the presence of the image for the experience of 3D image.

Since interest in 3D images is increasing and a method for extracting salient object from 3D image is used as a pre-process in 3D image processing, the method is very important. There have been a number of researches on the method for extracting salient object or region of an image in the field of computer vision applications such as image segmentation, image retrieval, object recognition, etc.

Korean patent publication No. 2013-0052393 (published on May 22, 2013, Title: apparatus and method for extracting object using 3D image) suggests that a 2D image and a 3D image for the object are obtained and the object is extracted in accordance with the size change of the object by distance information of 3D image.

In stereoscopic image, disparity information of the image is used to extract salient region. However, since it is difficult to calculate the image disparity information correctly, it is hard to extract salient object or region.

SUMMARY OF THE INVENTION

To solve the above problems, the present invention has an object to provide a method for extracting salient object region by reflecting the quality of disparity information applied to stereoscopic image.

Further, for the extraction of salient object from stereoscopic image, the present invention has another object to increase the accuracy of the extraction of salient object by applying elements which compensate disparity.

To achieve the object of the present invention, the present invention provides a method for extracting salient object from stereoscopic video comprising: (A) step of dividing regions based on the similarity of color and the distance between pixels in a left-eye image and a right-eye image which are used for an input stereoscopic image; (B) step of creating a disparity map of the divided regions based on a disparity obtained from a pixel difference of the left-eye image and the right-eye image; (C) step of calculating a contrast-based saliency by comparing the divided regions in the step (A) and the divided regions of the disparity map in the step (B); (D) step of calculating a prior-knowledge-based saliency based on a prior-knowledge for the divided regions in the step (A) and the divided regions of the disparity map in (B) step, the prior-knowledge being the features of the image which are visually distinct; and (E) step of extracting salient regions of the image based on the contrast-based saliency and the prior-knowledge-based saliency.

In one preferred embodiment, in the step (C), the contrast-based saliency is determined based on the color difference and the disparity of the divided regions and the contrast-based saliency is calculated by the reliability of the disparity which depends on the quality of the disparity.

Here, the reliability of the disparity is calculated by a curvature of the cost function for the disparity calculation.

In one preferred embodiment, the step (C) further comprises a step of calculating contrast-based saliency for the divided regions, based on the average of the contrast difference between one and each divided region of the divided regions of the step (A) and the step (B) and all the other divided regions.

Here, in the step (C), the contrast-based saliency is calculated by applying Battacharyya distance to the disparity and the color difference between the regions where the contrast difference is generated.

Further, in the step (C), the contrast-based saliency for the divided regions is calculated based on the average of the contrast difference between one and each divided region of the divided regions of the step (A) and the step (B) and the other divided regions adjacent to it.

Also, the step (D) comprises: a step of calculating image-based prior-knowledge saliency according to an image feature of the divided regions of the step (A) and the step (B); and a step of calculating space-based prior-knowledge saliency according to a space feature of the divided regions of the step (A) and the step (B). The prior-knowledge-based saliency is calculated based on the image-based prior-knowledge saliency and the space-based prior-knowledge saliency.

Here, the image-based prior-knowledge saliency reflects the prior-knowledge depending on frequency, color and size of the divided regions, and the space-based prior-knowledge saliency reflects the prior-knowledge depending on location and disparity of the divided regions.

Further, the prior-knowledge saliency depending on frequency is calculated based on the frequency which corresponds to the change of pixel value for the divided region by a band-pass filter after the color space having RGB value of the image is transformed into CIELab and a higher saliency is applied to the divided region of a higher frequency which corresponds to the change of pixel value.

Also, the prior-knowledge saliency based on the color is calculated according to CIELab color value of pixel of the divided region based on predetermined color-based saliency.

Also, the prior-knowledge saliency based on the size is calculated by the comparison of the size of the divided regions and a higher saliency is applied to a larger divided regions.

Also, the prior-knowledge saliency based on location is calculated depending on where the divided region is located with respect to the center of the image and a higher saliency is applied as the divided region is located near the center of the image.

Moreover, the prior-knowledge saliency based on disparity is calculated according to the disparity of the divided region of the step (B) and a higher saliency is applied as the divided region has a negative disparity.

According to the present invention, the ability to extract salient object is enhanced since salient object is extracted with considering the quality of disparity information applied to stereoscopic image.

Further, the accuracy of the extraction of salient object is increased in such a manner that contrast-based saliency is calculated using the color difference and disparity of the divided regions and prior-knowledge-based saliency having image-based prior-knowledge saliency and space-based prior-knowledge saliency is calculated and then the object is extracted from the contrast-based saliency and the prior-knowledge-based saliency.

DETAILED DESCRIPTION OF THE DRAWINGS

Hereinafter, examples of the present invention will be described in detail referring to attached drawings.

Figure 1:
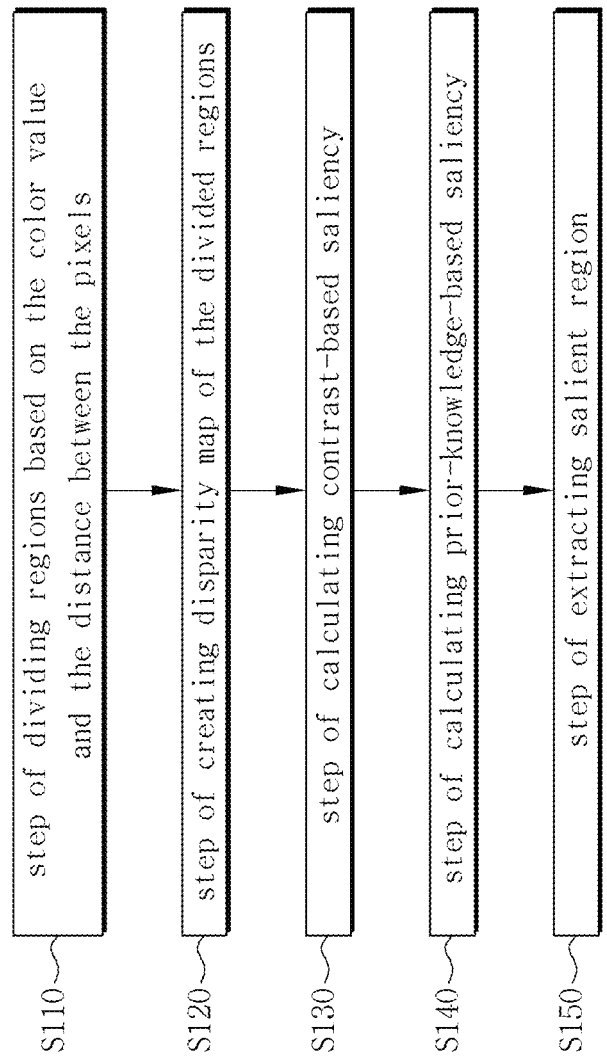
FIG. 1 is a flow diagram showing steps to extract salient object according to the present invention.

FIG. 1 shows steps to extract salient object according to the present invention. Referring to FIG. 1, the method for extracting salient object according to the present invention comprises: a step (S110) of dividing regions based on the color value and the distance between the pixels; a step (S120) of creating disparity map of the divided regions; a step (S130) of calculating contrast-based saliency; a step (S140) of calculating prior-knowledge-based saliency; and a step (S150) of extracting salient region.

In one embodiment, prior to the step (S110) of dividing region based on the color value and the distance between the pixels, a disparity map is created first and a stereoscopic image for the division of image region is input. In the stereoscopic image, binocular disparity is used and a left-eye image and a right-eye image are provided, respectively. Here, each image is a two-dimensional (2D) image.

In the step (S110) of dividing regions based on the color value and the distance between the pixels, image is divided into sub-regions and the division of a 2D left-eye image and a 2D right-eye image is performed by the similarity of color values of the image and the distance between pixels. When color of a pixel in the image is similar to that of the other adjacent pixel and the other pixel is located within certain distance, the two pixels are divided to be included in the same region.

In the step (S120) of creating disparity map of divided regions, the divided regions of the 2D left-eye image and the 2D right-eye image which are input as a stereoscopic image are compared to each other and the degree of protrusion of the object, i.e., the depth of the object, is represented as a disparity map.

Figure 3:
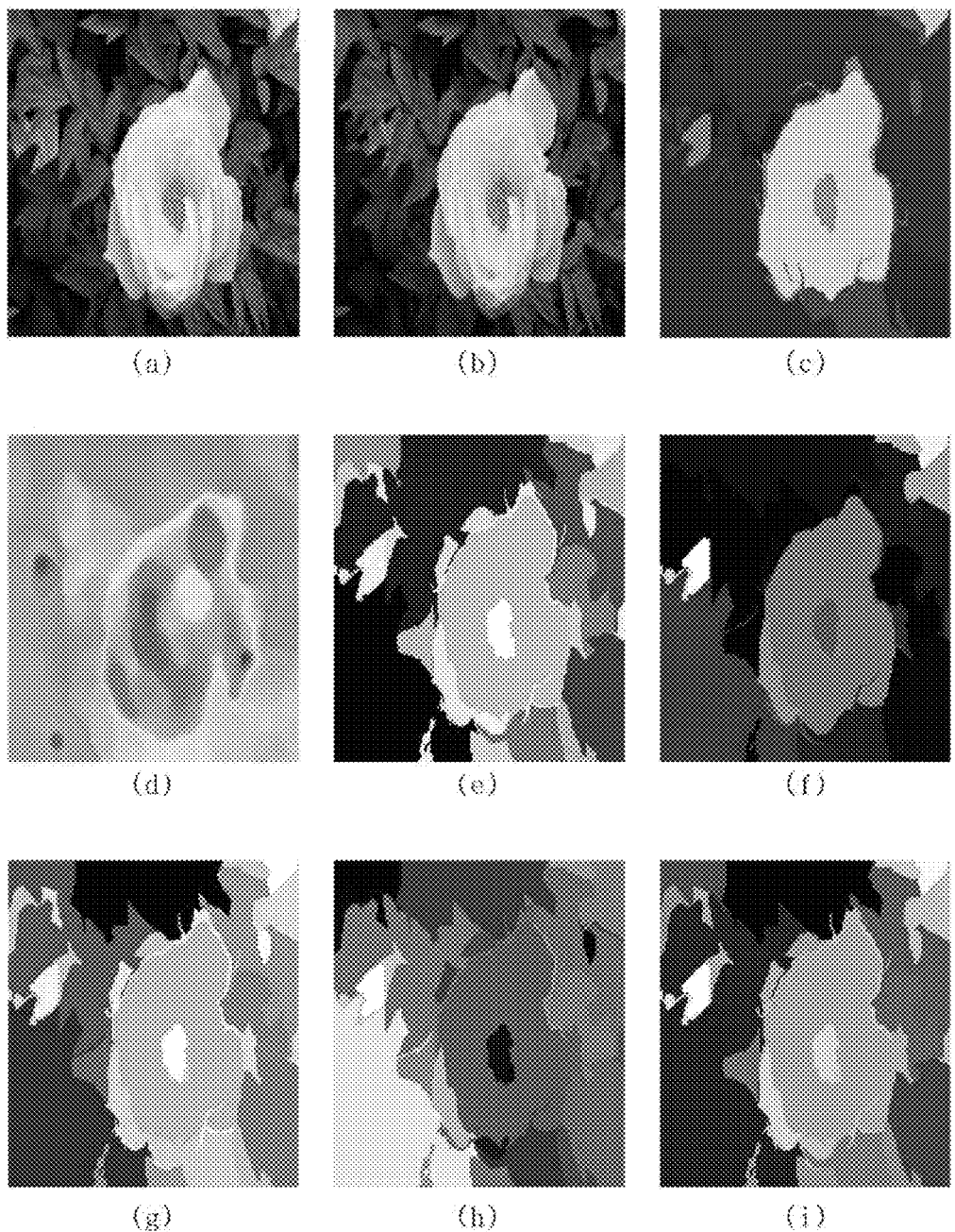
FIG. 3 is a series of photo illustrations of exemplary images of the contrast-based saliency according to the present invention.
Figure 5:
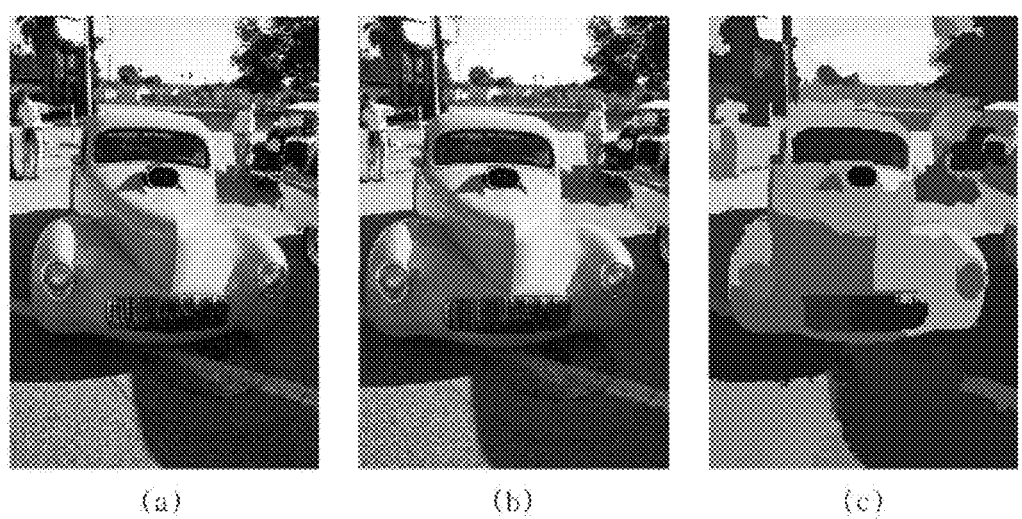
FIG. 5 is a series of photo illustrations showing exemplary images according to the prior-knowledge-based saliency.
Figure 5:
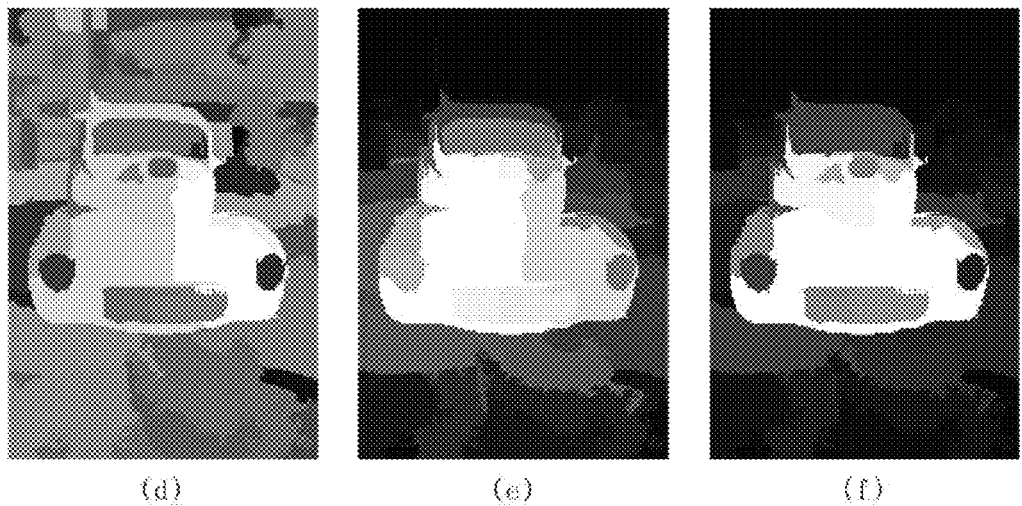

Here, the disparity map represents the depth of each pixel of stereoscopic image by the distance between corresponding pixels of the left-eye image and the right-eye image. The disparity of each divided region is calculated by the average disparity of pixels in the divided region. In FIGS. 3 and 5 which will be referred to by the description below, the disparity map provides color to represent the display depth. However, color is exemplarily provided for better understanding of the depth of the disparity map. In the present invention, the disparity map is created by providing brightness which depends on the depth of the object. In more detail, the disparity map is created by brightness of gray color. Therefore, the regions having similar protrusions are provided with gray color having the same brightness.

The degree of protrusion can be identified with intuition depending on the brightness of the disparity map and it also can be identified easily by the processor using the disparity map.

The step (S110) of dividing regions based on the color value and the distance between the pixels and the step (S120) of creating a disparity map of the divided regions are pre-processes of the step (S130) of calculating contrast-based saliency and the step (S140) of calculating prior-knowledge-based saliency which will be explained hereinafter.

Figure 2:
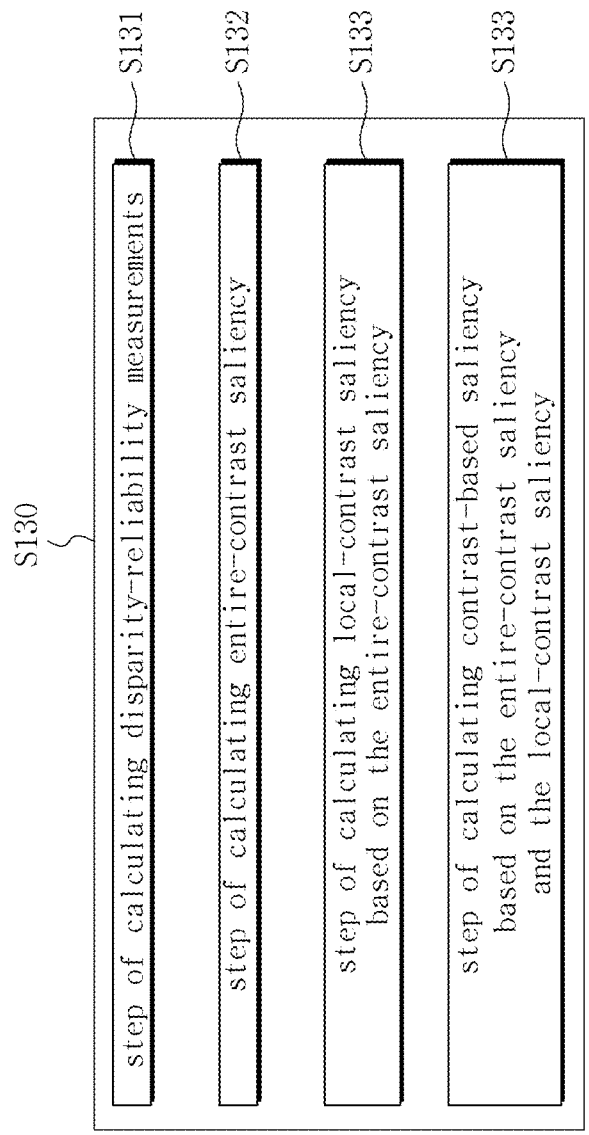
FIG. 2 is a flow diagram showing exemplarily steps to calculate contrast-based saliency according to the present invention.

FIG. 2 shows exemplarily the step of calculating contrast-based saliency according to the present invention and FIG. 3 is exemplary images of the contrast-based saliency according to the present invention.

Referring to FIGS. 2 and 3, the step of calculating contrast-based saliency according to the present invention comprises a step (S131) of calculating disparity-reliability measurements; a step (S132) of calculating entire-contrast saliency; a step (S133) of calculating local-contrast saliency based on the entire-contrast saliency; and a step (S134) of calculating contrast-based saliency based on the entire-contrast saliency and the local-contrast saliency. The disparity information and the color of the given stereoscopic image are key information to analyze the saliency of the image. In the present invention, accordingly, the saliency of the region is calculated by the color and the disparity information in the divided regions.

The step (S131) of calculating disparity-reliability measurements and the step (S132) of calculating entire-contrast saliency will be described hereinafter. For the calculation of the saliency of the region using the disparity information, the cost function and the curvature are used as the disparity-reliability to reflect the quality of the disparity information applied to the image.

The curvature of the cost function for the disparity calculation indicates the degree of change for the similar function in the vicinity of the maximum similarity score. The low curvature of the cost function for the disparity calculation is obtained when the matching quality is low.

The curvature $C_f(x)$ of the cost function for the disparity calculation is obtained by [formula 1].

$$C_f(x) = -2c(x,d) + c(x,d-1) + c(x,d+1) \qquad \text{[formula 1]}$$

Here, $$c(x,d) = \frac{1}{\|W(x)\|} \sum_{x \in N(x)} e(x,d), \; e(x,d) = \sum_{ch \in (R,G,B)} |I_{ch}^{L}(x) - I_{ch}^{R}(x-d)|,$$

d is a disparity, W(x) is a local window where the center is x, and $I_{ch}^{L}$ and $I_{ch}^{R}$ are normalized left-eye image and right-eye image in the channel (ch), respectively.

The average of curvature of cost curve function for the pixel in the region is used to calculate the quality of the disparity information in each region. Therefore, the disparity reliability $\lambda_R$ for the region R is obtained by [formula 2].

$$\lambda_R = \frac{1}{n_R} \sum_{x=(x,y) \in R} 1 - \exp\left(-\frac{|C_f(x)|}{\sigma_{cf}}\right) \quad \text{[formula 2]}$$

Here, $n_R$ is the number of pixel in the region R and $\sigma_{cf}$ is a parameter.

Therefore, the entire-contrast-based saliency which reflects the disparity-reliability measurements is obtained by [formula 3].

$$S_g(R_i) = \sum_{R_i \neq R_k} (1 - \lambda_{R_i}) D_c(R_i, R_k) + \lambda_{R_i} D_d(R_i, R_k) \quad \text{[formula 3]}$$

Here, $D_c(\bullet,\bullet)$ is the difference of color in the two regions, $D_d(\bullet,\bullet)$ is the difference of disparity in the two regions, and $\lambda_R$ is the disparity reliability in the region R.

Regarding the color difference in the two regions, Battacharyya distance of the color distribution in the two regions is used.

Since attention is generally paid to the center in the region, the weight function $k(r)=1-r^2$ is used in the present invention. By this function, the color distribution in the region R is defined as [formula 4].

$$p(R) = \{p_R^{(u)}\}_{u=1,\ldots,m} \quad \text{[formula 4]}$$

Here, $$\rho_R^{(u)} = N_c \sum_{i=1}^{m} k(\|x_i - x_c\|) \delta[b(x_i) - u],$$

$x_j$ is a normalized pixel location, $x_c$ is a normalized center location in the region R, $b_c(\bullet)$ is a mapping function to bin index in the color space quantized at the pixel, $\delta$ is a Kronecker delta function, and $N_c$ is a normalizing constant.

Based on the Battacharyya distance in the two regions, the color difference (color distance) in the two regions is obtained by [formula 5].

$$D_c(R_i,R_j) = \sqrt{1-\rho[p(R_i),p(R_j)]} \quad \text{[formula 5]}$$

Here, $$\rho[p(R_i), p(R_j)] = \sum_{u=1}^{m} \sqrt{p_{R_i}^{(u)} \cdot p_{R_j}^{(u)}}.$$

The disparity difference is calculated in a similar way to the color difference. To calculate the disparity difference in the two regions, the disparity distribution is used similarly to the color difference method. Therefore, the disparity distribution for the region R is obtained by [formula 6].

$$q(R) = \{q_R^{(u)}\}_{u=1,\ldots,m} \quad \text{[formula 6]}$$

Here, $$q_R^{(u)} = N_d \sum_{i=1}^{m} k(\|x_i - x_c\|) \delta[b(x_i) - u],$$

$x_c$ is a center of region R, $b_d(\bullet)$ is a mapping function to bin index in the disparity space quantized at the pixel, $\delta$ is a Kronecker delta function, and $N_d$ is a normalizing constant.

Therefore, using Battacharyya distance in the disparity distribution of the two regions, the disparity difference $D_d(\bullet,\bullet)$ in the two region is calculated by [formula 7].

$$D_d(R_i,R_j) = \sqrt{1-\rho[q(R_i),q(R_j)]} \quad \text{[formula 7]}$$

The color difference and disparity in the image region is the calculation of the contrast value of each divided region with respect to the entire region. The entire contrast is the average of the differences between one region and all the other regions. The local contrast which will be described below is the average of the difference between one divided region and the other region adjacent to it. For the entire contrast, since a region having the highest contrast difference is visually distinct over the entire image, it can be considered as a salient region. Similarly, for the local contrast, a region having the highest contrast difference compared to adjacent regions is considered as a salient region.

The step (S133) of calculating local-contrast saliency will be described considering the disparity reliability. According to Gestalt Principle, people tend to make a group on regions which look similar or are adjacent to each other. In the present invention, to apply Gestalt Principle, contrast information between one region and other regions adjacent to it is used and the local-contrast saliency is calculated by [formula 8].

$$S_l(R_i) = \sum_{R_j \in N(R_i)} (1-\lambda_{R_i}) D_c(R_i, R_j) + \lambda_{R_i} D_d(R_i, R_j) \quad \text{[formula 8]}$$

Here, $N(R_i)$ is a region adjacent to the region $R_i$.

In the step (S134) of calculating contrast-based saliency, the contrast-based saliency in each region R is calculated by [formula 9] considering the entire-contrast saliency and the local-contrast saliency.

$$S_{cr}(R_i) = \alpha_1 S_g(R_i) + \alpha_2 S_l(R_i) \quad \text{[formula 9]}$$

Here, $\alpha_1$ and $\alpha_2$ are weight functions. The disparity and the color difference between divided regions are obtained for the entire region and the local region by using the disparity-reliability according to the disparity quality. Then, the extraction of salient region is carried out with considering the entire contrast and the local contrast, thereby increasing the reliability of extracting the object.

Figure 4:
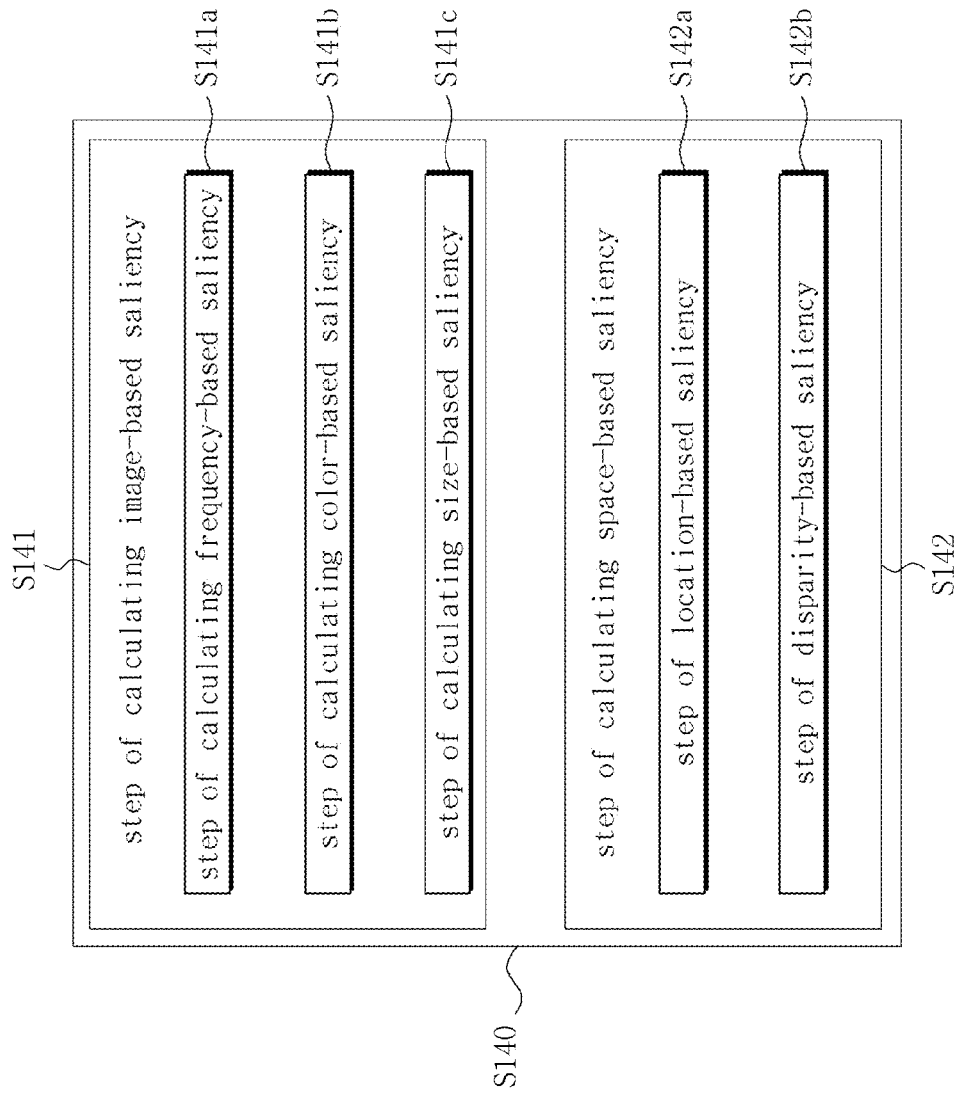
FIG. 4 is a flow diagram showing steps to calculate prior-knowledge-based saliency.

FIG. 4 shows steps of calculating prior-knowledge-based saliency and FIG. 5 shows exemplary images according to the prior-knowledge-based saliency.

Referring to FIGS. 4 and 5, the step (S140) of calculating a prior-knowledge-based saliency comprises a step (S141) of calculating image-based prior-knowledge saliency according to image feature of divided regions and a step (S142) of calculating space-based prior-knowledge saliency according to space feature of divided regions. The step (S141) of calculating image-based saliency comprises a step (S141a) of calculating frequency-based saliency, a step (S141b) of calculating color-based saliency and a step (S141c) of calculating size-based saliency. The step (S142) of calculating space-based saliency comprises a step (S142a) of location-based saliency and a step (S142b) of disparity-based saliency.

In the step (S141) of calculating image-based saliency, the image-based prior-knowledge saliency $S_{img}(R)$ is defined as [formula 10].

$$S_{img}(R)=(\gamma_1 S_F(R)+\gamma_2 S_C(R)+\gamma_3 S_A(R)) \quad \text{[formula 10]}$$

Here, $S_F$ is a frequency-based prior-knowledge saliency, $S_C$ is a color-based prior-knowledge saliency, $S_A$ is a size-based prior-knowledge saliency, and $\gamma_1$, $\gamma_2$ and $\gamma_3$ are weight functions, respectively.

In the step (S142) of calculating the space-based prior-knowledge saliency, the space-based prior-knowledge saliency $S_{spa}(R)$ is defined as [formula 11].

$$S_{spa}(R)=S_L(R) \cdot S_D(R) \quad \text{[formula 11]}$$

Here, $S_L$ is a location-based prior-knowledge saliency and $S_D$ is a disparity-based prior-knowledge saliency.

The prior-knowledge-based saliency $S_{pk}(R)$ is defined as [formula 12] by the product of the image-based prior-knowledge saliency and the space-based prior-knowledge saliency.

$$S_{pk}(R)=S_{img}(R) \cdot S_{spa}(R) \quad \text{[formula 12]}$$

In the step (S141a) of calculating frequency-based saliency, a band-pass filter is used. Here, the frequency is a frequency for image processing and is image frequency data obtained by Fourier transform of image data. Saliency is applied according to frequency corresponding to the change of pixels in the transformed region. For given image, color space is transformed from RGB space to CIELab and then the frequency-based saliency $S_F(R)$ for region R is calculated by [formula 13].

$$S_F(R) = \frac{1}{2}(S_{DoG}(R) + S_{IGb}(R)) \quad \text{[formula 13]}$$

Here, $$S_{DoG}(R) = \frac{1}{n_R} \sum_{x \in R} [(I_L^\mu - I_L^G(x))^2 + (I_a^\mu(x) - I_a^G(x))^2 + (I_b^\mu(x) - I_b^G(x))^2]^{\frac{1}{2}}$$

$$S_{IGb}(R) = \frac{1}{n_R} \sum_{x \in R} [(I_L(x) * G_L)^2 + (I_a(x) * G_L)^2 + (I_b(x) * G_L)^2]^{\frac{1}{2}},$$

\* is a convolution operator, $I_L^\mu$, $I_a^\mu$ and $I_b^\mu$ are the average of the pixel values calculated in the color-space of channel L, channel a and channel b according to CIELab and $I_L^G$, $I_a^G$ and $I_b^G$ are Gaussian Blur image for channel L, channel a and channel b according to CIELab.

$G_L$ is a Gabor filter and is defined as follows.

$$G_L(u, v) = \exp\left(-\frac{\log\left(\frac{\sqrt{u^2+v^2}}{\omega_0}\right)}{2\sigma_F^2}\right)$$

Here, (u,v) is coordinates in the frequency space, $\sigma_F$ is a filter bandwidth and $\omega_0$ is a center of frequency.

Regarding the step (S141b) of calculating color-based saliency, people pay attention to warm color such as red rather than cold color such as blue. In the present invention, the saliency of an image is calculated by values in channel a and channel b from CIELab color information of the image.

For given pixel CIELab color, the color-based saliency $S_C(R)$ is calculated by [formula 14].

$$S_C(R) = 1 - \exp\left(-\frac{C_a(R) + C_b(R)}{\sigma_C^2}\right) \quad \text{[formula 14]}$$

Here, $$C_a(R) = \frac{1}{n_R}\sum_{x \in R} a(x), \; C_b(R) = \frac{1}{n_R}\sum_{x \in R} b(x),$$

$\sigma_C$ is a parameter, $a(\cdot)$ is a value of normalized channel a and $b(\cdot)$ is a value of normalized channel b.

Regarding the step (S141c) of calculating size-based saliency, people pay attention to a larger region rather than a smaller region. Therefore, the size for each region is applied and the size-based saliency $S_A(R)$ is calculated by [formula 15].

$$S_A(R) = 1 - \exp\left(-\frac{A(R)}{\sigma_{area}^2}\right) \quad \text{[formula 15]}$$

Here, $\sigma_{area}$ is a parameter and $A(\cdot)$ is an area of normalized region.

Regarding the step (S142b) of calculating location-based saliency, people pay attention to the center of the image rather than the side of the image. Therefore, the location-based saliency $S_L(R)$ is calculated by [formula 16].

$$S_L(R) = \frac{1}{n_R}\sum_{x \in R} \exp\left(-\frac{\|x-c\|_2^2}{\sigma_{loc}^2}\right) \quad \text{[formula 16]}$$

Here, $\sigma_{loc}$ is a parameter and c is a center location of the image.

Regarding the step (S142b) of calculation of the disparity-based saliency, the object having negative disparity in the stereoscopic image tends to protrude from the screen. People pay attention to the object having high negative disparity. Therefore, the disparity-based saliency $S_D(R)$ is calculated by [formula 17].

$$S_D(R) = 1 - \exp\left(-\frac{\lambda_R \cdot D(R)}{\sigma_{dis}^2}\right) \quad \text{[formula 17]}$$

-continued $$\text{Here, } D(R) = \frac{d_{max} - d(R)}{d_{max} - d_{min}}, d(R) = \frac{1}{n_R}\sum_{x \in R} d(x),$$

$\sigma_{dis}$ is a parameter, $d_{max}$ and $d_{min}$ are the maximum disparity of the image and the minimum disparity of the image, respectively, d(•) is a disparity value and $\lambda_R$ is a disparity reliability of region R.

It was described in the above that the prior-knowledge information for the saliency of the image is used to calculate the saliency of the image more accurately. As shown in FIG. 5, it can be seen that the saliency for each divided region is calculated by the prior-knowledge-based saliency. The method of extracting the prior-knowledge-based saliency is useful to calculate the saliency of the image simply and efficiently since it does not use context information.

According to the present invention, the stereoscopic-based region saliency uses the contrast-based saliency and the prior-knowledge-based saliency and is defined as [formula 18].

$$S(R_i) = \begin{cases} S_{ct}(R_i) \cdot S_{pk}(R_i) & \text{if } S_{ct}(R_i) \cdot S_{pk}(R_i) > 0.2 \\ 0 & \text{otherwise} \end{cases} \quad \text{[formula 18]}$$

Here, to represent the resulting stereoscopic saliency as value whose range is from 0 to 1, $S_{ct}$ and $S_{pk}$ use each of the minimum and maximum values (min, max) of the calculated contrast-based saliency and the prior-knowledge-based saliency and also use the linear transform of [formula 19] such that the contrast-based saliency and the prior-knowledge-based saliency have the value whose range is from 0 to 1.

$$f(x) = \frac{1}{max - min}(x - min) \quad \text{[formula 19]}$$

Hereinafter, to statistically evaluate the ability to extract the salient object in the stereoscopic image according to the present invention, the results obtained by Stereo Saliency Benchmark Dataset will be explained. By the comparison of the main methods to extract the object using fixed thresholding method and adaptive thresholding method, the ability to extract the object according to the present invention can be seen.

Six methods for the comparison of suggested methods are as follows:

CA: S. Goferman, L. Zelnik-Manor, and A. Tal. "Context-aware saliency detection," In CVPR'10, pages 2376-383, 2010.

GB: J. Harel, C. Koch, and P. Perona, "Graph-based visual saliency," Adv. Neural Information Process. Syst., vol. 19, pp. 545-552, 2007.

SR: X. Hou and L. Zhang, "Saliency detection: a spectral residual approach," In CVPR'07, pp. 1-8, 2007.

FT: R. Achanta, S. Hemami, F. Estrada, and S. Susstrunk, "Frequency-tuned salient region detection," In CVPR'09, pp. 1597-1604, 2009.

RC: M. Cheng, G. Zhang, N. J. Mitra, X. Huang, and S. Hu, "Global contrast based salient region detection," In CVPR'11, pp. 409-416, 2011.

SS: Y. Niu, Y. Geng, X. Li, and F. Liu, "Leveraging stereopsis for saliency analysis," In CVPR'12, pp. 454-461, 2012.

In the method of fixed thresholding method, a binary image obtained from the variation of the thresholding values from 0 to 255 are compared with a ground-truth mask image to calculate the average precision-recall value. Precision-recall curves are obtained with respect to the methods of CA, GB, SR, FT, RC and SS and the method according to the present invention by the average precision-recall value and then the precision-recall curves are compared to each other to assess the performance of extracting the object.

In the method of adaptive thresholding, figure of merit is calculated by using thresholding value obtained from [formula 20] and by comparing F-measurements obtained from [formula 21] with the methods of CA, GB, SR, FT, RC and SS and the method according to the present invention.

$$T_a = \frac{2}{W \cdot H}\sum_{x=1}^{W}\sum_{y=1}^{H}S(x, y) \quad \text{[formula 20]}$$

Here, W and H are the width and the height of the saliency map and S(x,y) is a value of the saliency for location (x, y).

$$F = \frac{(1 + \beta^2)P_r \cdot R_c}{\beta^2 P_r + R_c} \quad \text{[formula 21]}$$

Here, $P_r$ is a precision value and $R_c$ is a recall value.

Figure 6A:
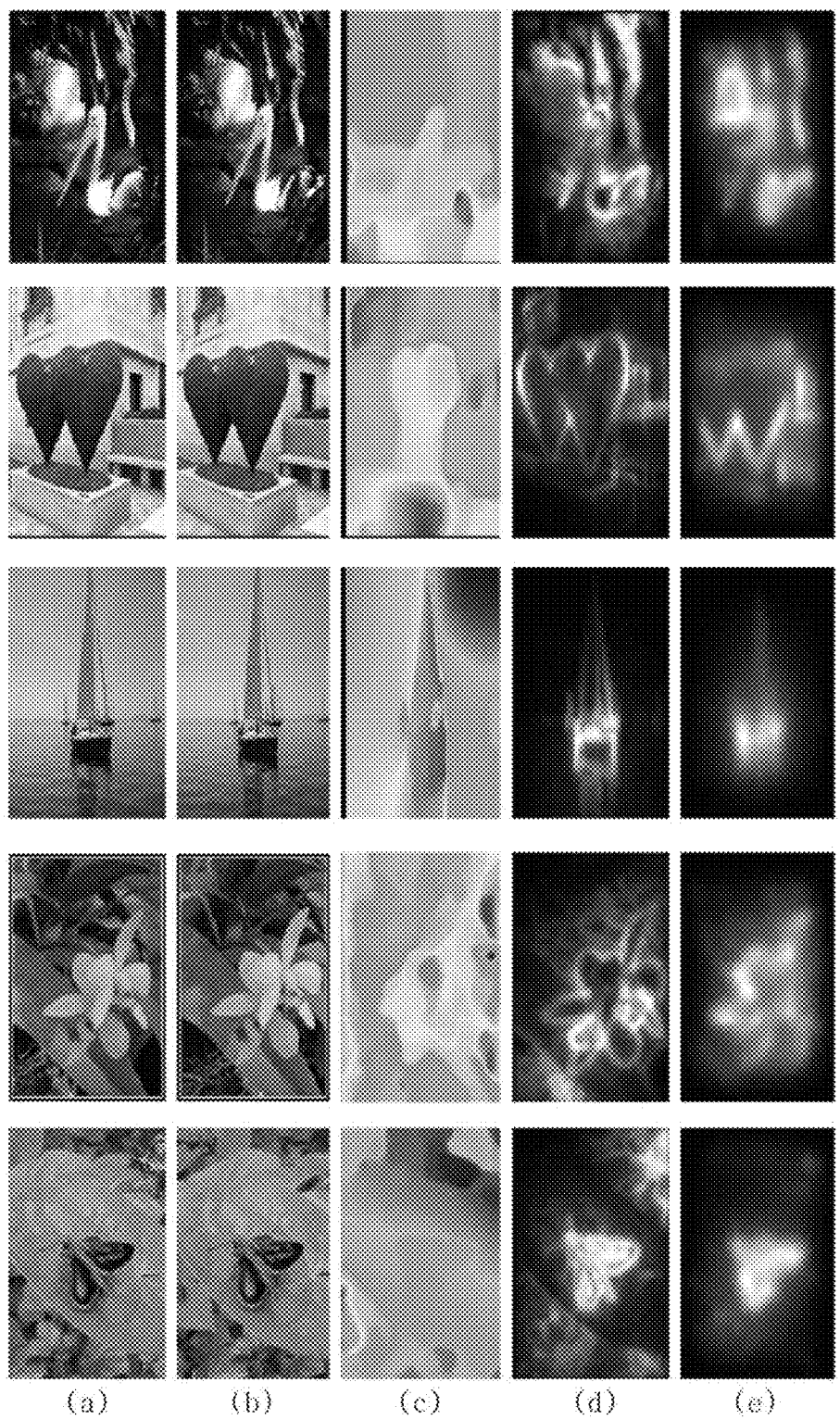
FIGS. 6a and 6b are series of photo illustrations showing the results of the object extracted according to the present invention.
Figure 6B:
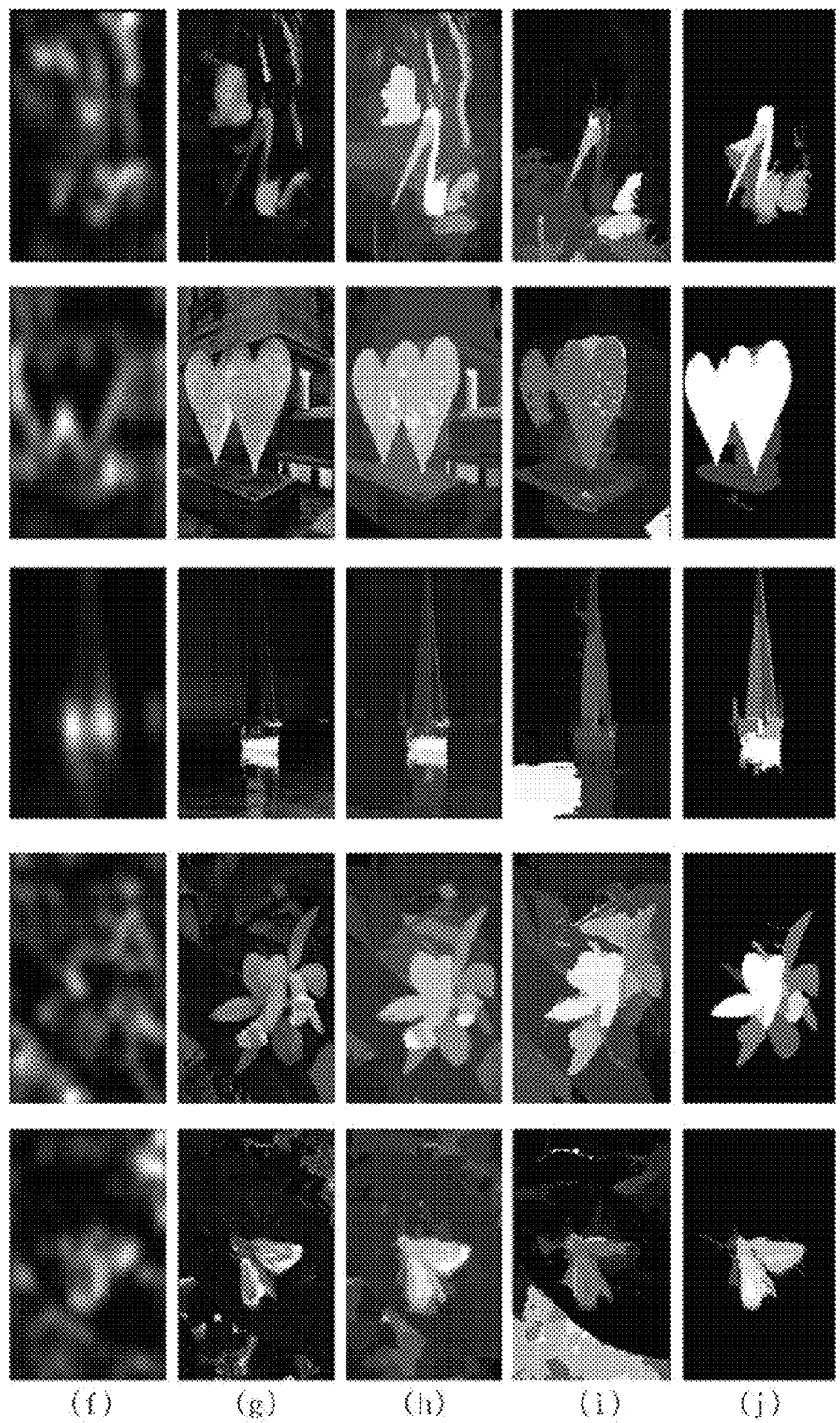
Figure 7:
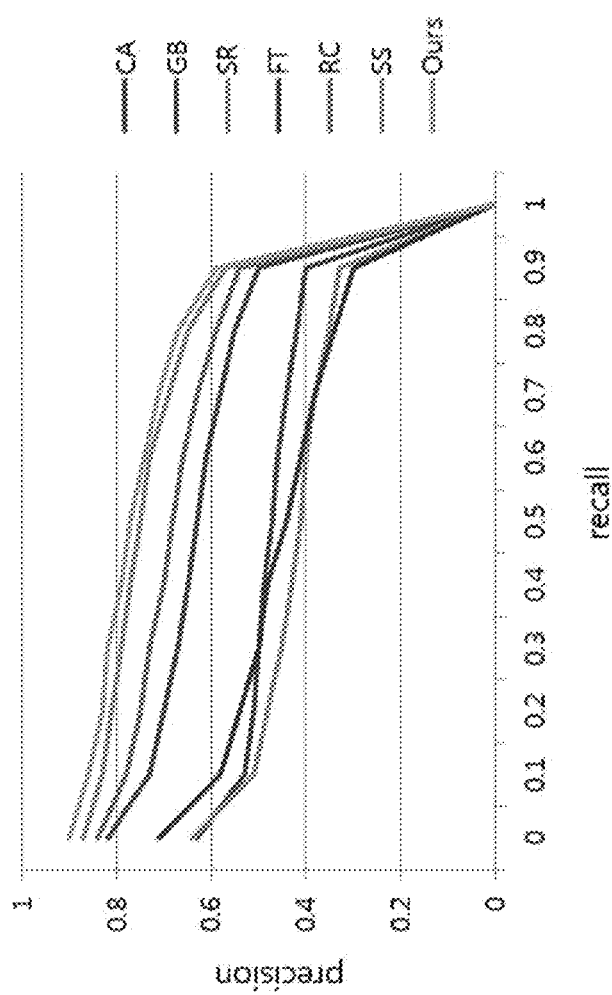
FIGS. 7 and 8 are graph illustrations showing the results of the object extracted according to the present invention.
Figure 8:
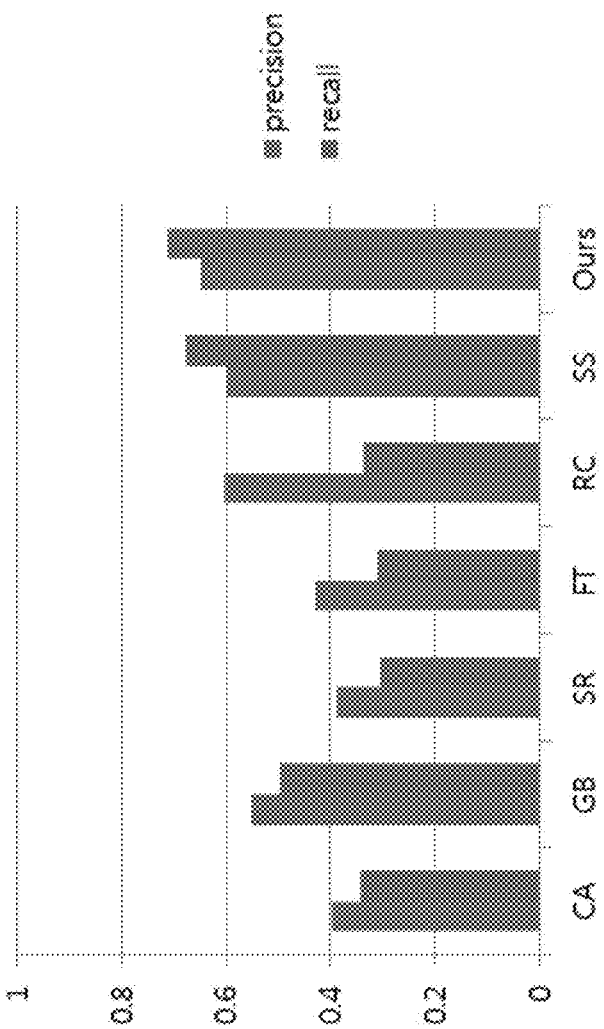

FIGS. 6 to 8 show the results of the object extracted according to the present invention. In particular, FIG. 6 provides that the examples of the salient regions extracted for the image are compared with the methods according to prior arts. In FIG. 6, there are five examples of input images which are arranged vertically. The examples are arranged horizontally in FIG. 6 to show a disparity map and to compare the resulting object extracted according to prior arts.

In FIG. 6, (a) is a left-eye image of the input image, (b) is a right-eye image of the input image, (c) is a disparity map which represents disparity obtained from pixel differences of the input left-eye image and the input right-eye image, (d) to (i) are results of the object extraction for CA of prior arts, GB of prior arts, SR of prior arts, FT of prior arts, RC of prior arts, SS of prior arts, respectively, and (j) is a result of the object extraction for each input image according to the present invention.

FIG. 7 shows precision-recall curve which is calculated by the fixed thresholding and FIG. 8 shows the comparison of F-measurements. In the figures, it can be understood that the present invention provides enhanced ability to extract the object compared to the prior arts.

It is intended that the foregoing description has described only a few of the many possible implementations of the present invention, and that variations or modifications of the embodiments apparent to those skilled in the art are embraced within the scope and spirit of the invention. The scope of the invention is determined by the claims and their equivalents.

We claim:

1. A method for extracting salient object from stereoscopic video comprising the steps of:
   (A) dividing regions based on similarity of color and distance between pixels in a left-eye image and a right-eye image from an input stereoscopic image;
   (B) creating a disparity map of divided regions based on a disparity obtained from a pixel difference of the left-eye image and the right-eye image;

(C) calculating a contrast-based saliency by comparing the regions in the step (A) and the divided regions of the disparity map in the step (B);
(D) calculating a prior-knowledge-based saliency based on a prior-knowledge for the regions in the step (A) and the divided regions of the disparity map in (B) step, the prior-knowledge being comprised of features of the image being visually distinct; and
(E) extracting salient regions of the image based on the contrast-based saliency and the prior-knowledge-based saliency,
wherein in the step of calculating (C), the contrast-based saliency is determined based on color difference and disparity of the divided regions,
wherein the contrast-based saliency is calculated by reliability of the disparity dependent upon quality of the disparity,
wherein the reliability of the disparity is calculated by a curvature of cost function for a disparity calculation, and
wherein the curvature is $C_f(x) = -2c(x,d) + c(x,d-1) + c(x,d+1)$
wherein $$c(x, d) = \frac{1}{\|W(x)\|} \sum_{x \in N(x)} e(x, d), \; e(x, d) = \sum_{ch \in (R,G,B)} |I_{ch}^L(x) - I_{ch}^R(x - d)|,$$

d is a disparity, W(x) is a local window where a center is x, $I_{ch}^L$ and $I_{ch}^R$ are a left image and a right image normalized in a channel ch, respectively.

2. The method according to claim 1, wherein the step of calculating (C) further comprises:
calculating contrast-based saliency for the divided regions, based on average of contrast difference between each divided region of the divided regions of the step of dividing (A) and the step of creating (B) and the other divided regions.

3. The method according to claim 2, wherein in the step of calculating (C), the contrast-based saliency is calculated by applying Battacharyya distance to the disparity and color difference between the regions where contrast difference is generated.

4. The method according to claim 3, wherein in the step of calculating (C), the contrast-based saliency for the divided regions is calculated based on average of the contrast difference between each divided region of the divided regions of the step (A) and the step (B) and the other divided regions adjacent to it.

5. The method according to claim 1, wherein the step of calculating (D) comprises:
calculating image-based prior-knowledge saliency according to an image feature of the divided regions of the step of dividing (A) and the step of creating (B); and
a step of calculating space-based prior-knowledge saliency according to a space feature of the divided regions of the step of dividing (A) and the step of creating (B);
wherein the prior-knowledge-based saliency is calculated based on the image-based prior-knowledge saliency and the space-based prior-knowledge saliency.

6. The method according to claim 5, wherein the image-based prior-knowledge saliency reflects the prior-knowledge depending on frequency, color and size of the divided regions, and wherein the space-based prior-knowledge saliency reflects the prior-knowledge depending on location and disparity of the divided regions.

7. The method according to claim 6, wherein the prior-knowledge saliency based on the size is calculated by the comparison of the size of the divided regions and wherein a higher saliency is applied to a larger divided region.

8. The method according to claim 6, wherein the prior-knowledge saliency based on the location is calculated depending on the location of the divided region with respect to the center of the image and wherein a higher saliency is applied as the divided region is located near the center of the image.

9. The method according to claim 6, wherein the prior-knowledge saliency based on disparity is calculated according to disparity of the divided region of the step of creating (B), and wherein a higher saliency is applied as the divided region has a negative disparity.

10. A method for extracting salient object from stereoscopic video comprising the steps of:
(A) dividing regions based on similarity of color and distance between pixels in a left-eye image and a right-eye image from an input stereoscopic image;
(B) creating a disparity map of divided regions based on a disparity obtained from a pixel difference of the left-eye image and the right-eye image;
(C) calculating a contrast-based saliency by comparing the regions in the step (A) and the divided regions of the disparity map in the step (B);
(D) calculating a prior-knowledge-based saliency based on a prior-knowledge for the regions in the step (A) and the divided regions of the disparity map in (B) step, the prior-knowledge being comprised of features of the image being visually distinct; and
(E) extracting salient regions of the image based on the contrast-based saliency and the prior-knowledge-based saliency,
wherein the step of calculating (D) comprises:
calculating image-based prior-knowledge saliency according to an image feature of the divided regions of the step of dividing (A) and the step of creating (B); and
a step of calculating space-based prior-knowledge saliency according to a space feature of the divided regions of the step of dividing (A) and the step of creating (B),
wherein the prior-knowledge-based saliency is calculated based on the image-based prior-knowledge saliency and the space-based prior-knowledge saliency,
wherein the image-based prior-knowledge saliency reflects the prior-knowledge depending on frequency, color and size of the divided regions,
wherein the space-based prior-knowledge saliency reflects the prior-knowledge depending on location and disparity of the divided regions,
wherein the prior-knowledge saliency depending on frequency is calculated based on frequency corresponding to change of pixel value for the divided region by a band-pass filter after the color space having RGB value of the image is transformed into CIELab, and
wherein a higher saliency is applied to the divided region of higher frequency which corresponds to the change of pixel value.

11. A method for extracting salient object from stereoscopic video comprising the steps of:
(A) dividing regions based on similarity of color and distance between pixels in a left-eye image and a right-eye image from an input stereoscopic image;
(B) creating a disparity map of divided regions based on a disparity obtained from a pixel difference of the left-eye image and the right-eye image;

(C) calculating a contrast-based saliency by comparing the regions in the step (A) and the divided regions of the disparity map in the step (B);
(D) calculating a prior-knowledge-based saliency based on a prior-knowledge for the regions in the step (A) and the divided regions of the disparity map in (B) step, the prior-knowledge being comprised of features of the image being visually distinct; and
(E) extracting salient regions of the image based on the contrast-based saliency and the prior-knowledge-based saliency,
wherein the step of calculating (D) comprises:
calculating image-based prior-knowledge saliency according to an image feature of the divided regions of the step of dividing (A) and the step of creating (B); and
a step of calculating space-based prior-knowledge saliency according to a space feature of the divided regions of the step of dividing (A) and the step of creating (B),
wherein the prior-knowledge-based saliency is calculated based on the image-based prior-knowledge saliency and the space-based prior-knowledge saliency,
wherein the image-based prior-knowledge saliency reflects the prior-knowledge depending on frequency, color and size of the divided regions,
wherein the space-based prior-knowledge saliency reflects the prior-knowledge depending on location and disparity of the divided regions, and
wherein the prior-knowledge saliency based on the color is calculated according to CIELab color value of pixel of the divided region based on predetermined color-based saliency.

* * * * *